July 11, 1933.  A. W. CLARKE  1,917,923

BALL FRAME FOR SHAKER CHUTES

Filed July 29, 1932   2 Sheets-Sheet 1

INVENTOR
Allen W. Clarke
BY
F. H. Gibbs
ATTORNEY

July 11, 1933.  A. W. CLARKE  1,917,923
BALL FRAME FOR SHAKER CHUTES
Filed July 29, 1932  2 Sheets-Sheet 2
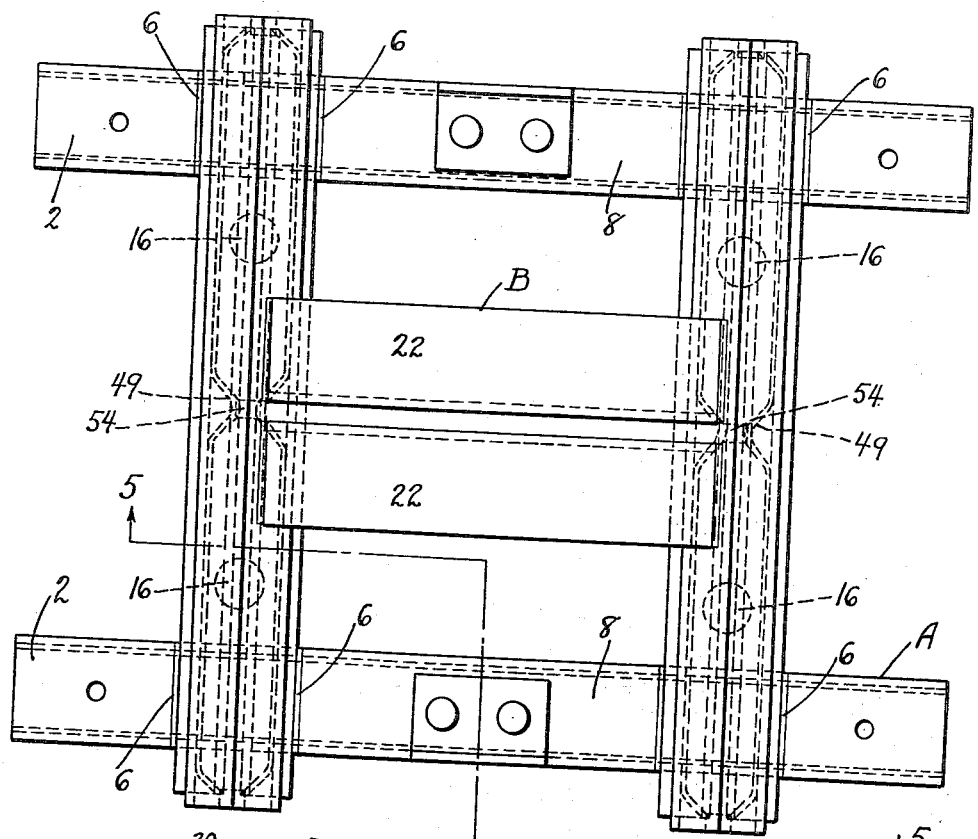
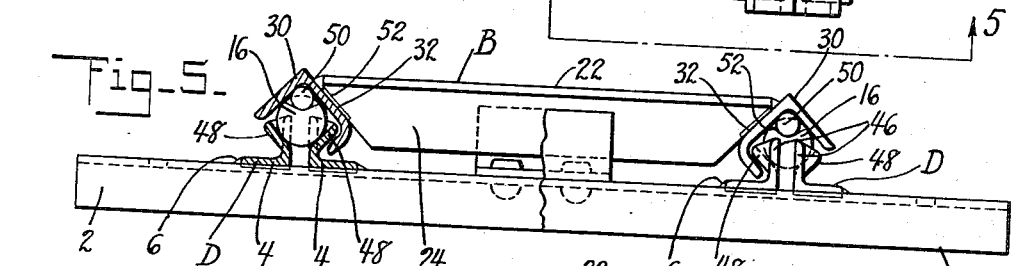
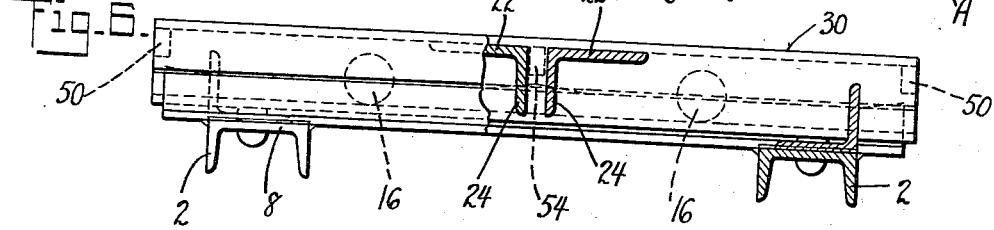
INVENTOR
Allen W. Clarke
BY F. H. Gibbs
ATTORNEY Patented July 11, 1933

1,917,923

UNITED STATES PATENT OFFICE

ALLEN W. CLARKE, OF BERWICK, PENNSYLVANIA, ASSIGNOR TO AMERICAN CAR AND FOUNDRY COMPANY, OF NEW YORK, N. Y., A CORPORATION OF NEW JERSEY

BALL FRAME FOR SHAKER CHUTES

Application filed July 29, 1932. Serial No. 625,636.

This invention relates generally to shaker chutes used in mining operations and for other purposes and has particular reference to ball frames for supporting the individual trough sections of which the chute is composed.

Shaker chutes now in use are usually composed of a series of trough sections secured together end to end with the individual trough sections supported for reciprocation on devices known in the art as ball frames.

Ball frames previously used have possessed certain disadvantages in that the construction thereof resulted in considerable sliding friction which detracts from the efficiency of the device. In view of this one object of the present invention is to provide a ball frame for shaker chutes in which sliding friction is eliminated irrespective of the positions of the respective parts.

In use, forces develop which tend to shift the trough section or chute both vertically and sidewise and the present invention comprises a ball frame having provision for preventing excessive sidewise and vertical shifting of the trough section relative to the ball frame.

Another object of this invention is the provision of a ball frame for a shaker chute which is adapted to operate in a minimum of head room.

A further object of this invention is the provision of a ball frame for shaker chutes which is formed almost entirely of commercial structural shapes thereby providing a device which is easy and inexpensive to manufacture and which is strong and durable in operation.

Other objects and advantages of this invention will be apparent from the following description taken in conjunction with the accompanying drawings in which:

Fig. 4 is a top plan view of a modified form of ball frame.

Fig. 5 is a sectional view on the line 5—5 of Fig. 4, and

Fig. 6 is a side elevation of the form of ball frame shown in Figs. 4 and 5.

Referring now more particularly to the drawings in which similar characters of reference designate similar parts in the several views, the ball frame comprises generally a base frame indicated at A and a trough supporting body member B to which a trough section C is connected; the body member B being mounted for reciprocation upon reciprocation of the trough section C, as will be more clearly pointed out hereinafter.

Figure 1:
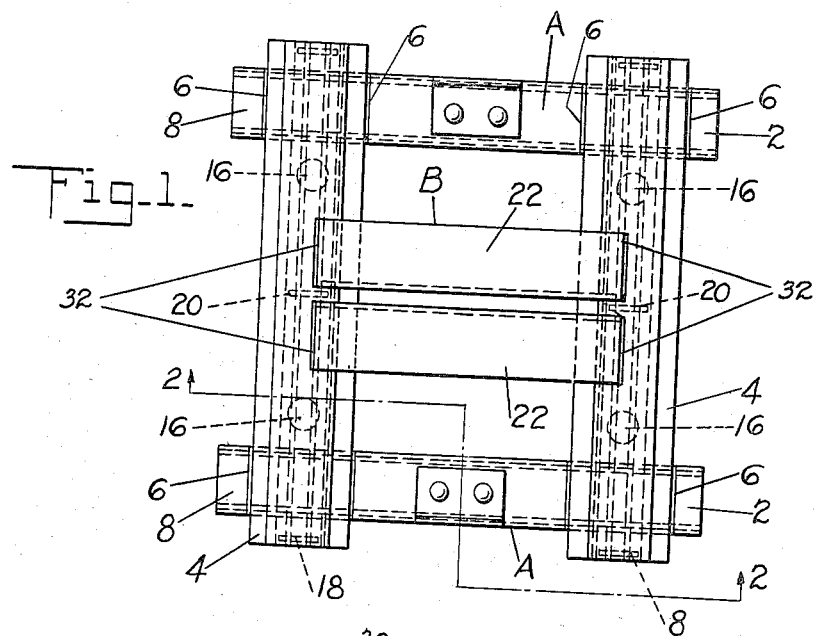
Figure 1 is a top plan view of the ball frame of the present inventon.
Figure 2:
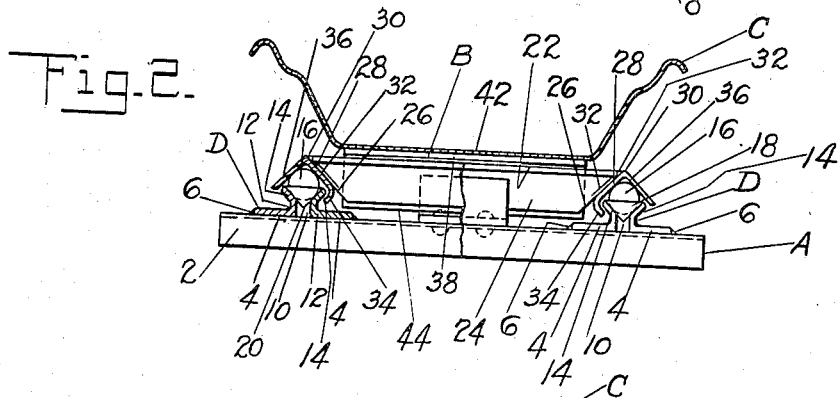
Fig. 2 is a sectional view taken on the line 2—2, Fig. 1; this figure showing a trough section associated therewith.
Figure 3:
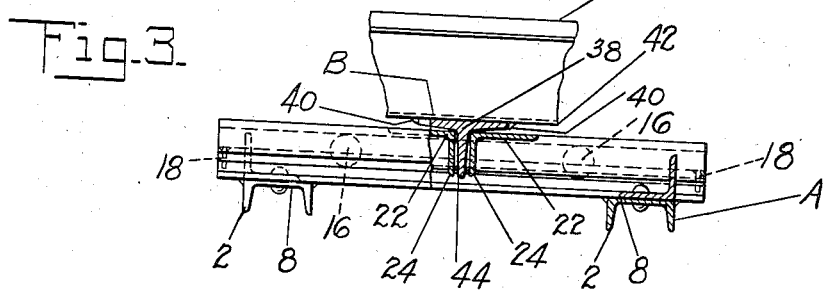
Fig. 3 is a side elevation of the ball frame shown in Fig. 1, certain parts being broken away to disclose other parts in section.

The base frame A of Figs. 1, 2 and 3 comprises a pair of spaced rigid members 2, downwardly facing channels in the instance shown, which are connected by a pair of lower raceway members indicated generally at D and each formed of a pair of adjacent but oppositely arranged angles 4, the horizontal legs of which rest upon and are preferably secured as by welding 6 to the webs 8 of the channels 2. As clearly shown in Fig. 2, the angles 4 of each of the raceways D are spaced from each other to provide an opening 10 which extends from end to end of the raceways D for a purpose to be hereinafter described. Also as clearly shown in Fig. 2, the upper portions of the vertical legs 12 of the angles 4 are bent back in the direction of horizontal legs of the angles as shown at 14 to provide upwardly diverging walls which constitute bearing surfaces of the raceways D for receiving anti-friction elements in the form of balls 16.

The respective angles of the lower raceways D are connected at their end portions by closure plates 18 welded to the walls 14 and providing end stops to prevent accidental removal of the balls 16 during operation of the ball frame. Intermediate the end portions of the raceways D spacer members 20 are provided which are fitted within the ball race and preferably welded thereto and serve to retain the balls 16 in spaced relation as will be apparent.

The balls 16 reciprocably support the body member B comprising, in the instance shown, a pair of plates 22 arranged side by side in spaced relation and having their adjacent edge portions downwardly flanged as shown at 24 (see Fig. 3), the end portions of said flanges being beveled as at 26 to rest upon the inner legs 28 of downwardly facing angles 30 and to which legs they are welded as shown at 32. The angles 30 constitute upper raceways which rest on the balls 16 and the edge portions of the inner legs 26 are inwardly flanged as at 34 to underlie or lap the flanges 14 of the inner angles of the lower raceways (see Fig. 2) whereby the upper and lower raceways are arranged in cooperating relation in such a manner as to prevent excessive sidewise and vertical shifting of the body member relative to the base frame. Due to the relative positions of the upper and lower raceways, it is obvious that the inner and outer legs 28 and 36 of the upper raceways form housings over the lower raceways to prevent the admission of dirt or other foreign matter such as coal dust or the like into the lower raceways.

The body member supports the trough section C for reciprocation and said trough section is provided with a connecting element 38, shown as a T section in Fig. 3, which is suitably connected as by welding at 40 to the lower surface of the bottom 42 of the trough section, the vertical leg 44 of the connecting element being positioned in the space defined between the depending flanges 24 of the adjacent edge portions of the plates 22.

Figs. 4, 5 and 6 disclose a modified form of the invention illustrated in Figs. 1, 2 and 3 and described above, and it can be seen that the lower raceways D each comprises a pair of spaced angle members arranged back to back in spaced relation, the vertical flanges 46 thereof, intermediate their end portions, being upwardly inclined in opposite directions, as shown at 48; the inclined portions commencing at the end portions of the angle members, as shown clearly in Fig. 4; the end portions of the vertical flanges being adjacently arranged (see Fig. 5) whereby to provide stop members at the ends of the lower raceways D to prevent accidental removal of the balls 16. It will be obvious that with this construction the necessity of using an independent stop member such as shown at 18 in Figs. 2 and 3 is eliminated. Approximately midway between the ends of the respective angles forming the lower raceways D, the vertical flanges 46 thereof are pressed inwardly toward each other as shown at 49 to provide a central stop means for retaining the balls 16 in spaced relation.

In some instances it is desirable to provide stop members on the upper raceways 30 and in the instance shown the end portions of the upper raceways 30 are provided with stops 50 welded as at 52 to the legs of the angles 30 at the junction of the inner and outer legs thereof as clearly shown in Fig. 5. Approximately midway between the ends of the upper raceways 30 a stop member 54 is provided which is welded or otherwise secured within each angle 30, as clearly shown in Fig. 6 of the drawings.

The construction shown in Figs. 4 to 6, inclusive, provides lower raceways D each comprising a pair of angles which may be formed in one operation to provide the construction illustrated, thus eliminating the necessity of welding supplemental pieces such as stops, partitions and barriers.

From the above description it is believed that the construction and operation of the device of the present invention will be fully apparent to those skilled in the art. It is obvious that when the trough section C is reciprocated the body member B will be shifted or reciprocated on the balls 16 and that excessive sidewise and vertical shifting is prevented by the lapping relation of the upper and lower raceway members. It is further apparent that the upper raceway members constitute a protective housing for the lower raceway members to prevent the passage of dirt or other foreign matter into the lower raceway members. In use, regardless of protective measures, dirt such as coal dust or the like, often lodges in the lower raceway members but in the construction shown and described herein such dirt or coal dust immediately passes out of the lower raceway members through the opening 19 formed as a result of the spaced relation of the angles 4 of the respective lower raceway members D.

The drawings herein illustrate one embodiment of this invention but it is to be understood that they are for illustrative purposes only and various changes in the form and proportion of the device may be made within the scope of the appended claims without departing from the spirit of the invention.

What is claimed is:

1. A ball frame for shaker chutes comprising a base frame having spaced lower raceways each formed of a pair of angle members having adjacently arranged upwardly extending portions providing bearing surfaces, anti-friction elements in the said raceways and supported on the bearing surfaces, angle-shaped upper raceways mounted on the anti-friction elements in such a manner as to constitute housings covering the lower raceways and provided with portions arranged in lapping relation with respect to one of the angles of each of said lower raceways whereby excessive vertical and sidewise shifting of the upper raceways relative to the lower raceways is prevented.

2. A ball frame for shaker chutes comprising a base frame having spaced lower raceways each formed of a pair of angle members having adjacently arranged upwardly extending portions providing bearing surfaces, anti-friction elements in said raceways and supported on the bearing surfaces, angle-shaped upper raceways mounted on the anti-friction elements in such a manner as to constitute housings covering the lower raceways and provided with portions arranged in lapping relation with respect to one of the angles of each of said lower raceways whereby excessive vertical and sidewise shifting of the upper raceways relative to the lower raceways is prevented, and a trough supporting body member extending between and connected to the upper raceways.

3. In a ball frame for shaker chutes, a base frame comprising spaced base members, spaced raceways connecting said members and each formed of a pair of angles having vertical flanges adjacently arranged and portions of said vertical flanges bent in the direction of the horizontal legs of said angles whereby to provide means for supporting anti-friction elements therebetween.

4. A ball frame for shaker chutes comprising a base frame having spaced lower raceways each formed of a pair of spaced angles with adjacent flanges thereof vertically arranged and having portions thereof bent to provide means for supporting anti-friction elements therebetween, anti-friction elements supported by said raceways, downwardly facing angles supported for reciprocation on said anti-friction elements and having one of the legs of each thereof inturned to underlap portions of the lower raceways so that excessive sidewise and vertical shifting of said upper raceways relative to the lower raceways is prevented, and a pair of plates extending between said upper raceways and having contiguous edge portions thereof downwardly flanged and welded to said upper raceways.

5. A ball frame for shaker chutes comprising a base frame having lower raceways each formed of a pair of rigid elements arranged in spaced relation and having upright portions, parts of said upright portions being flanged in opposite directions, stop members extending between and welded to said rigid elements at the end portions thereof, anti-friction elements in said raceways, a trough supporting body member, and downwardly facing angles welded to opposite edge portions of said body member and resting on the anti-friction elements in such a manner as to form housings over the lower raceways, one of the legs of each of said angles being arranged in lapping relation with respect to the lower raceways whereby said trough supporting body member is prevented against excessive sidewise and vertical shifting relative to the ball frame.

6. A ball frame for shaker chutes comprising a base frame having a pair of downwardly facing channel members, spaced pairs of rigid elements connecting said channels and each having upwardly diverging portions constituting lower raceways therebetween, antifriction elements in said raceways, a pair of plates arranged in spaced relation and having adjacent portions thereof downwardly flanged, downwardly facing angles welded to the flanges of said plates and resting upon said anti-friction elements, said angles having portions thereof arranged in lapping relation with the lower raceways whereby upon reciprocation of said plates excessive sidewise and vertical shifting thereof is prevented.

7. A ball frame for shaker chutes comprising a base frame having spaced lower raceways each formed of a pair of angle-shaped members arranged back to back, the adjacent portions of said angle members being relatively so formed and arranged as to provide bearing surfaces, anti-friction elements supported on said bearing surfaces, angle-shaped upper raceways mounted on the anti-friction elements in such a manner as to provide housings covering said lower raceways and having portions arranged in lapping relation with respect to one of the angle-shaped members of each of said lower raceways to provide means for preventing excessive vertical and sidewise shifting of the upper raceways relative to the lower raceways.

In witness whereof I have hereunto set my hand.

ALLEN W. CLARKE.